United States Patent [19]
Bradford et al.

[11] Patent Number: 5,552,488
[45] Date of Patent: Sep. 3, 1996

[54] PROCESS FOR PRODUCING A CROSSLINKED POLYMER USING A β-DICARBONYL COMPOUND

[75] Inventors: Christopher J. Bradford, Ann Arbor; Adriana Ticu, Livonia, both of Mich.

[73] Assignee: BASF Corporation, Southfield, Mich.

[21] Appl. No.: 457,921

[22] Filed: Jun. 1, 1995

Related U.S. Application Data

[62] Division of Ser. No. 745,407, Aug. 15, 1991.

[51] Int. Cl.$^6$ ............................ C08L 61/06; C08L 61/28
[52] U.S. Cl. ........................ 525/163; 525/123; 525/510; 525/512; 525/481; 525/508; 525/452; 525/453; 525/165
[58] Field of Search .................... 525/163, 123, 525/510, 512, 481, 508, 452, 453, 165

[56] References Cited

U.S. PATENT DOCUMENTS

| | | | |
|---|---|---|---|
| 3,892,903 | 7/1975 | Dowbenko | 428/460 |
| 4,689,373 | 8/1987 | Auerbach | 525/398 |
| 4,935,149 | 6/1990 | Morse | 210/712 |
| 5,160,503 | 1/1992 | Smith | 8/115.7 |
| 5,194,674 | 3/1993 | Pacifici | 560/198 |
| 5,268,502 | 12/1993 | Pacifici | 560/198 |
| 5,276,130 | 1/1994 | Bradford et al. | 528/230 |
| 5,288,820 | 2/1994 | Rector, Jr. et al. | 525/510 |

*Primary Examiner*—W. Robinson H. Clark
*Attorney, Agent, or Firm*—Paul L. Marshall

[57] ABSTRACT

In a process for crosslinking a polymer, a β-dicarbonyl functionality is present as a reactive diluent and/or as a reactive solvent and/or on a crosslinking entity. The β-difunctional compound reacts with formaldehyde which is either released during the crosslinking reaction (or otherwise present) whereby less formaldehyde is released, than would otherwise be released. The formaldehyde which reacts with the β-dicarbonyl compound is either incorporated into the crosslinked polymer network or released in the form of a reaction product which is not as harmful to the environment as the unreacted formaldehyde. The process enables the reduction of formaldehyde release during crosslinking to levels otherwise unobtainable. Furthermore, the process enables a reduction in the amount of organic solvent utilized.

3 Claims, No Drawings

PROCESS FOR PRODUCING A CROSSLINKED POLYMER USING A β-DICARBONYL COMPOUND

This is a divisional of copending application Ser. No. 07/745,407 filed on Aug. 15, 1991.

BACKGROUND OF THE INVENTION

The present invention relates to a process for crosslinking a polymer with a β-dicarbonyl compound. According to the process and composition of the present invention, the presence of a β-dicarbonyl compound:

(1) is advantageous because it can serve as a diluent for the polymer and thereby eliminate the need for large quantities of volatile organic compounds which serve as solvents for the polymer to be crosslinked;

(2) is advantageous because the β-dicarbonyl compound can serve as a reactive diluent in that it reacts with the polymer during the crosslinking reaction, which of course prevents emissions of the β-dicarbonyl compound itself during the crosslinking reaction (which typically occurs at elevated temperatures); and (3) acts as a solvent that is not currently on the EPA Air Toxins list, and is therefore limited only by the VOC regulations.

The process of the present invention is useful for the crosslinking of any polymer, and is especially useful for the crosslinking of polymers in the production of coatings, adhesives, as well as other end uses such as plastics. Significant environmental concerns elevate the value of reducing the volatile organic compounds which are otherwise emitted during the crosslinking of polymers.

The use of β-dicarbonyl compounds is of even greater importance if aminoplast crosslinkers are used therewith in the crosslinking of the polymer. Aminoplast crosslinkers are reaction products of amino compounds and aldehydes. These may then be further reacted with mono-functional alcohols. Some examples of amino compounds useful for making aminoplast crosslinkers are melamine, urea, benzoguanamine, glycoluril, ethylene diamine, etc. Some examples of aldehydes useful for making aminoplast crosslinkers are formaldehyde and butyraldehyde. Some examples of similarly useful monofunctional alcohols are methanol, butanol, iso-butanol and 2-ethyl hexanol.

Aminoplast crosslinkers, for example methylated melamine-formaldehyde, as well as phenolic resins, release formaldehyde during crosslinking. It has been found that the presence of the β-dicarbonyl functionality reduces formaldehyde emissions because the β-dicarbonyl functionality consumes formaldehyde during the crosslinking reaction. As a result, formaldehyde emissions can be significantly reduced through the presence of β-dicarbonyl functionalities during the crosslinking reaction. This result is beneficial because formaldehyde is known to be both toxic and carcinogenic, and to react in the atmosphere in a manner adversely affecting the ozone layer. It has been found that the process of the present invention can reduce this release of formaldehyde by at least 50 percent, compared with the identical process without the β-dicarbonyl functionality present.

Thus the presence of β-dicarbonyl functionalities can provide at least two advantageous effects: (1) reducing the amount of organic solvent necessary to disperse the polymer, as well as (2) consumption of formaldehyde released if aminoplast crosslinkers and/or other formaldehyde resins are utilized in the crosslinking reaction.

The process of the present invention involves the use of β-dicarbonyl compounds in one or more of several forms. First, the β-dicarbonyl compound may be used in its "free" form, i.e. unbound to any polymer or to any crosslinker. In the free form, the β-dicarbonyl compound can act as a solvent if the compound has the requisite mobility. Second, the β-dicarbonyl functionality can be located on the crosslinker molecule. Third, the β-dicarbonyl compound can be located on the crosslinkable polymer. Ultimately, i.e. upon crosslinking, the β-dicarbonyl compounds consumed in the crosslinking reaction are part of the crosslinked polymer network. That is, the β-dicarbonyl compounds consumed in the crosslinking reaction are ultimately bound to both the crosslinker as well as to the crosslinkable polymer.

Among the art known to the inventors of the present invention is a publication released by Eastman Kodak. This publication describes the process of reacting tertiary butyl acetoacetate with a crosslinkable polymer, whereby the reaction product is the polymer substituted with an acetoacetoxy group. The Eastman publication thereafter states that upon crosslinking the polymer with an aminoplast crosslinker such as melamine, the acetoacetoxy group reacts with the crosslinker.

The inventors of the present invention are aware of several additional documents which are related to the present invention, each of which is briefly discussed below.

U.S Pat. No. 4,054,232, entitled "Fluid Containers" relates to pods for holding photographic solutions having strong edge seal areas and relatively weaker edge seal areas which are designed to break open when pressure is applied to the pod for releasing a photographic solution onto a sheet of paper or film. Column 4, lines 46–68 of this patent describes crosslinked homopolymers and copolymers containing units of 2-acetoacetoxyethyl methacrylate, wherein the crosslinking is performed by reacting the polymeric 2-acetoacetoxyethyl methacrylate with an aldehyde (formaldehyde is specifically mentioned).

A publication entitled "Synthesis of Acetoacetylated Resins and applications for Acetoacetate Chemistry in Thermoset Coatings" by F. Del Rector et al, of Eastman Chemicals, discloses that the methylene group of the acetoacetyl functionality can be reacted with aldehydes, especially formaldehyde (see page 17 thereof). Page 1 of this publication states that the acetoacetyl functionality has recently been gaining acceptance for usage in the coatings industry, and furthermore that the acetoacetyl group has previously not been utilized in coatings due to difficulties in incorporating the acetoacetyl group onto a polymer chain. Accordingly, it is clear that this article teaches that for use in coatings the acetoacetyl functionality should be attached to the polymer. As with the '232 patent, this article describes the use of the acetoacetyl functionality in polymeric form.

Another Eastman Kodak publication, entitled "Acetoacetoxyethyl Methacrylate (AAEM) And Acetoacetyl Chemistry", states (on page 8 thereof) that aldehydes, especially formaldehyde, rapidly condense with the active methylene groups of acetoacetylated polymers, and that this reaction can be used to form bridges between proximate methylene groups and can, therefore, be used to crosslink linear polymers into thermoset materials. This article states merely that the acetoacetyl functionality reacts with the aldehyde functionality.

Another Eastman Kodak piablication, entitled "Tertiary-Butyl Acetoacetate (t-BAA): A New Monomer for the Synthesis of Acetoacetyl-Functional Resins" states that solution viscosity can be reduced by the addition of the bulky acetoacetyl group to a polymer chain. Furthermore, this publication states that the acetoacetyl group will react with such conventional crosslinkers as melamines and isocyanates. The clear implication of these statements is that the acetoacetyl functionality, being attached to the polymer chain, is useful for the crosslinking of the polymer because it is reactive with conventional crosslinking entities such as melamines and isocyanates.

Another Eastman Kodak publication (1986), entitled "Reactions of Acetoacetylated Polymers" states that acetoacetyl groups which are attached to a polymer can be used to modify or crosslink that polymer, and that this reaction is useful in the coatings industry. The article goes on to explain how acetoacetylated polymers can be prepared. The article also states that aldehydes, especially formaldehyde, rapidly condense with the active methylene group of acetoacetylated polymers, and that this reaction can be used to form bridges between proximate methylene groups, and is therefore frequently used to crosslink linear polymers into thermoset materials. This article states only the use of the acetoacetyl functionalities as a reactant located on a polymer, i.e. as a principal crosslinker.

F. Del Rector, W. W. Blount, and D. R. Leonard, all of Eastman Chemicals, published an April 1989 article in the *Journal of Coatings Technology*, Vol. 61, No. 771, entitled "Applications for Acetoacetyl Chemistry in Thermoset Coatings". This article states that acetoacetyl functionality can be incorporated into different classes of resins and used in the preparation of thermoset coatings through a variety of crosslinking mechanisms. Furthermore, the article states that acetoacetyl-functional acrylic resins were prepared using a new methacrylic monomer, acetbacetoxyethyl methacrylate, and further that polyester resins were acetoacetylated by transesterification. Throughout this article the statements made are to the effect that the acetoacetoxy functionality should be on the polymer itself (see, for example, FIGS. 1 through 9, and the explanations accompanying them).

SUMMARY OF THE INVENTION

In contrast to the documents discussed above, the present invention involves the use of:

1. free β-dicarbonyl compounds (i.e. β-dicarbonyl compounds which are not pre-reacted with a crosslinkable polymer to be crosslinked), or
2. β-dicarbonyl compounds which have been prereacted with an aminoplast crosslinker, an aminofunctional moiety, or a hydroxyl-containing moiety, for use in crosslinking the crosslinkable polymer.

It has been discovered that the presence of such β-dicarbonyl compounds (i.e. as 1 and 2, supra) can be used to further decrease the emission of formaldehyde, in comparison with crosslinking processes in which the β-dicarbonyl compound is prereacted with any of the polymers which are to be crosslinked.

The present invention relates to: (1) a process for crosslinking a polymer, (2) a coated substrate, as well as (3) a method of controlling formaldehyde emissions during a crosslinking reaction. The method of crosslinking the polymer comprises, in general, reacting the polymer with a crosslinking entity in a crosslinking reaction, wherein the method further comprises consuming at least 50 weight percent of all formaldehyde which is present and/or liberated during the crosslinking reaction. The consumption of the formaldehyde is accomplished by reacting the formaldehyde with a β-dicarbonyl functionality. More specifically, the present invention relates particularly to a crosslinking process carried out by making a mixture of a crosslinkable polymer, a crosslinker, and a β-dicarbonyl functional reactive diluent, and thereafter curing the mixture so that the polymer, the crosslinker, and the β-dicarbonyl functional compound react with one another, whereby the polymer is crosslinked.

The present invention also relates to a method of producing a crosslinked polymer by first mixing a crosslinkable polymer with a reaction product of a crosslinker and a β-dicarbonyl functional compound, whereby a mixture is formed, followed by curing the mixture so that the crosslinkable polymer reacts with the reaction product of the crosslinker and the β-dicarbonyl functional compound, whereby the polymer is crosslinked.

The present invention also relates to a substrate having a coating thereon. The coating on the substrate comprises, in addition to the crosslinked polymer, at least 0.25 weight percent (preferably at least 0.5 weight percent) of at least one other compound which is at least one member selected form the group consisting of:

A. the reaction product of a nonpolymeric β-dicarbonyl compound with a crosslinker, which reaction product has been further reacted with formaldehyde; and B. the reaction product of a nonpolymeric β-dicarbonyl compound with formaldehyde.

Finally, the present invention relates to a method of controlling formaldehyde emissions. The method comprises consuming at least 50 percent of all formaldehyde which is present or liberated during a crosslinking reaction. The method comprises consuming the formaldehyde by reacting the formaldehyde with a β-dicarbonyl or β-keto-ester reactive diluent, or a β-dicarbonyl or β-keto-ester reactive solvent. The formaldehyde consuming reaction takes place in at least one location selected from the group consisting of: (1) a liquid film, and (2) a vapor in the immediate vicinity of a liquid film.

It is an object of the present invention to reduce the emission of formaldehyde during the curing of a crosslinked coating.

It is a further object of the present invention to react formaldehyde with a crosslinkable polymer and/or crosslinker and/or a reactive diluent, so that at least some of the formaldehyde becomes part of a crosslinked polymer network.

It is a further object of the present invention to reduce the amount of organic solvent required for the production of a cured coating.

It is a further object of the present invention to enable the production of hard, flexible cured coatings of a crosslinked polymer.

It is a further object of the present invention to reduce the amount of formaldehyde emitted during the crosslinking of a polymer by utilizing at least one reactive solvent selected from the group consisting of t-butyl acetoacetate, ethylacetoacetate, methyl-acetoacetate, 1,3- cyclopentanedione, 1,2-cyclopentadicarbonyl, 2,4-pentanedione.

It is a further object of the present invention to reduce the amount of formaldehyde emitted during the crosslinking of a polymer by utilizing at least one reactive solvent selected from the group consisting of a β-keto ester solvent and a β-dicarbonyl solvent.

It is a further object of the present invention to use a β-dicarbonyl moiety as a solvent which scavenges formaldehyde during the curing of a polymer while flash evaporation is occurring, as well as during storage of the polymer.

DETAILED DESCRIPTION OF THE PREFERRED EMBODIMENTS

The process of the present invention can be viewed as a method of producing a crosslinked polymer by making a mixture of:

(1) a crosslinkable polymer, and
(2) a crosslinker, and
(3) a β-dicarbonyl functional solvent and/or the reaction product of a β-dicarbonyl compound and the crosslinker, whereby a mixture is formed, and thereafter curing the mixture so that the crosslinkable polymer is crosslinked. In this process, the β-dicarbonyl compound, if present as a functional solvent (i.e. a reactive diluent) can function as a solvent for both the polymer and the crosslinker. Furthermore, the β-dicarbonyl compound functions as a reactant in the reaction which results in the crosslinking of the polymer and/or in a reaction with the crosslinking entity.

Thus, it is preferred that there be an excess of the β-dicarbonyl compound, i.e. more of the β-dicarbonyl compound than is needed to substantially fully crosslink the polymer. This excess of β-dicarbonyl reacts, at least in part, with the crosslinker If the crosslinker is an aminoplast crosslinker (or an aminoplast crosslinker which has degraded and thereby released formaldehyde), excess β-dicarbonyl compound can react with the aminoplast crosslinker (or with formaldehyde which is released from an aminoplast crosslinker which has degraded), thereby consuming formaldehyde which otherwise would be released during storage and/or the curing process as well as from the film after curing.

The crosslinkable polymers which can be used in the process of the present invention can generally be at least one member selected from the group consisting of an acrylic polymer, a polyester, a phenolic polymer, an epoxy polymer, and a polyurethane. Preferably, the crosslinkable polymer used in the process of the present invention is at least one member selected from the group consisting of an acrylic polymer, a polyester, a phenolic polymer, and a polyurethane. More preferably, the crosslinkable polymer of the present invention is at least one member selected from the group consisting of an acrylic polymer, a polyester, and a phenolic polymer. Still more preferably, the crosslinkable polymer of the present invention is at least one member selected from the group consisting of an acrylic polymer and a polyester. Most preferably, the crosslinkable polymer is an acrylic polymer. The amount of crosslinkable polymer is variable and dependent on the system and end use.

The process of the present invention also utilizes a β-dicarbonyl functional compound capable of acting as a crosslinker. Amine adducts of β-dicarbonyl compounds or β-keto esters, or hydroxyl adducts of β-keto esters, and β-dicarbonyl adducts of other polyfunctional moieties (such as β-keto-ester adducts) may be also be used.

If the β-dicarbonyl compound functions as a diluent for the crosslinkable polymer and the crosslinker which is present in the mixture, the β-dicarbonyl compound may also be referred to as a β-dicarbonyl reactive diluent. This is desirable because it reduces the amount of organic solvent which must otherwise be present in the mixture in order to carry out the process of producing a coated substrate. The β-dicarbonyl compound can, in general, act as a diluent for the crosslinkable polymer as well as the crosslinker (and any other organic solid present in the mixture) if the β-dicarbonyl compound is selected from those relatively low molecular weight β-dicarbonyl compounds which are a liquid at room temperature. For example, such β-dicarbonyl compounds which can be used as diluents comprise β-dicarbonyl polyol adducts, β-dicarbonyl polyamine adducts and larger molecular weight β-dicarbonyl moieties that remain in the film after curing. These β-dicarbonyl compounds are herein referred to as "reactive diluents" because they remain present (i.e. do not significantly volatilize), and are reactive with the crosslinker, the crosslinkable polymer, or an aldehyde. The β-dicarbonyl compounds are known to be reactive with aldehydes, amines, isocyanates, epoxies, divalent metals, diazonium salts, and α,β-unsaturated systems. Also, it should be noted that the "reactive diluent" not only provides a reactant which can be used in conjunction with crosslinkers to effectuate crosslinking of a crosslinkable polymer, the "reactive diluent" does this while simultaneously reducing the amount of organic solvent which would otherwise be necessary to allow the process of the present invention to be carried out.

The process of the present invention may also utilize a "reactive solvent" in the mixture. In contrast to the "reactive diluents" described above, a "reactive solvent" is a compound which is volatile enough that significant amounts thereof leave the film before, during, or after the curing step is performed. In contrast, a reactive diluent remains in the film. Compounds which may, in general, be utilized as reactive solvents are t-butyl acetoacetate, ethyl acetoacetate, methyl acetoacetate, 1, 3-cyclohexyl dione, aceto-acetoacy ethyl methacrylate, and 2,4-penta-dione. Preferably the reactive solvent is at least one member selected from the group consisting of t-butyl acetoacetate, methyl acetoacetate, and ethyl acetoacetate. Still more preferably the solvent is at least one member selected from the cyroup consisting of t-butyl acetoacetate, ethyl acetoacetate and methyl acetoacetate.

The level of reactive solvent or reactive diluent to be utilized in the mixture is dependent on VOC (volatile organic compound) requirements, and can go from as low as 5% to as high as 80%. The function of the reactive solvent is to:

1. lower formaldehyde emissions by scavenging (i.e. reacting with, i.e. consuming) formaldehyde in the film and/or air, through the formation of a relatively harmless compound in the air and in the film;
2. replace regulated solvents (i.e. solvents on the Air Toxin list).

The crosslinkers which can be used in the process of the present invention are, in general: aminoplasts, isocyanates, phenolics, or other formaldehyde-producing crosslinkers. Preferably the crosslinker is at least one member selected from the group consisting of aminoplast resins and phenolic resins. Still more preferably the crosslinker to be used in the process of the present invention is at least one member selected from the group consisting of alkylated melamine-formaldehyde, and alkylated urea-formaldehyde. Most preferably the crosslinker is alkylated melamine-formaldehyde.

The process of the present invention may utilize the reaction product of the β-dicarbonyl compound and the crosslinker. That is, the β-dicarbonyl compound can be "prereacted" with a compound which can be used as a crosslinker, whereafter the resulting reaction product can be used in the making of the mixture described above. In general, these reaction products of β-dicarbonyl compounds and crosslinkers are low molecular weight-polyols or polyamines. Preferably the reaction product of the β-dicarbonyl functional compound and the crosslinker is at least one member selected from the group consisting of a β-dicarbonyl adduct of a polyol, a β-dicarbonyl adduct of a polyamine, a β-dicarbonyl adduct of an isocyanate, and a β-dicarbonyl adduct of a polyurethane. Still more preferably, the adduct is a polyamine adduct or a polyol adduct.

If a reaction product of a crosslinker and a β-dicarbonyl compound is present, preferably during the curing at least some of the crosslinkable polymer reacts with the reaction product (of the crosslinker and the β-dicarbonyl compound) so that the polymer is crosslinked.

The process of the present invention stands in stark contrast to the crosslinking of a crosslinkable polymer with a crosslinker which, due to the absence of a β-dicarbonyl compound, reacts and crosslinks the polymer but which also releases formaldehyde into the environment as a by-product of such reaction. A release of formaldehyde is the commonplace result if an aminoplast or phenolic crosslinker is used. Also, if an aminoplast or phenolic crosslinker is used in the crosslinking process, this crosslinker is invariably supplied with "free formaldehyde" therewithin, i.e. formaldehyde which is unreacted with any other species. As a result, in prior art processes in which an aminoplast crosslinker was utilized, both significant amounts of "free formaldehyde" (i.e. unreacted formaldehyde which is present in the alkylated melamine formaldehyde), as well as significant amounts of "liberated formaldehyde" (i.e. formaldehyde which is released due to the reaction of the alkylated melamine formaldehyde with the crosslinkable polymer) were emitted. Of course, the emission of formaldehyde from both of these sources is an environmentally undesirable event.

The process of the present invention "consumes" both free formaldehyde, as well as liberated formaldehyde, by reacting with the formaldehyde whereby the formaldehyde becomes either incorporated into the crosslinked polymer network or reacted with a free β-dicarbonyl compound to result in a product which, even if released into the environment (i.e. not trapped within the film), is not as environmentally undesirable as the release of free formaldehyde into the environment.

The process of the present invention also relates to a method of crosslinking a crosslinkable polymer while consuming at least 50% weight percent of formaldehyde which is present as either free formaldehyde or liberated formaldehyde (i.e. formaldehyde released by either the degradation of the aminoplast crosslinker, or formaldehyde released during the crosslinking reaction). In the crosslinking reaction the formaldehyde is consumed by reacting the formaldehyde with a β-dicarbonyl functionality. Preferably, from about 55 weight percent to about 100 weight percent of all formaldehyde is consumed in the crosslinking reaction, and most preferably from about 80 to about 100 weight percent of all formaldehyde is consumed in the crosslinking reaction. In other words, the process of the present invention does not require that there be no emission of formaldehyde during the crosslinking reaction (i.e. during curing). Rather, emissions should be less than 50% of the emissions which occur in a standard which is identical except for the absence of β-dicarbonyl functionality therefrom.

The process of the present invention can be carried out by making a mixture. The mixture is made by mixing together reactants which react to form a crosslinked polymer network. If the β-dicarbonyl compound is present as a reactive diluent and/or as a reactive solvent, the mixture should comprise the crosslinkable polymer, the crosslinkers, and the β-dicarbonyl compound. If a reaction product of a crosslinker and a β-dicarbonyl reactant is being used, the mixture may be comprised of the crosslinkable polymer plus the reaction product of a crosslinker with a β-dicarbonyl compound.

The product of the present invention is a coated substrate which comprises at least one compound selected from the group consisting of:

A. a reaction product of a nonpolymeric β-dicarbonyl compound and a crosslinker, which reaction product has been further reacted with formaldehyde, and B. the reaction product of a nonpolymeric β-dicarbonyl compound with formaldehyde.

In general, this compound (or compounds) is present in the coating in an amount of at least about 0.25 weight percent, and preferably at least about 0.5 weight percent, based on the weight of the coating. With respect to the amount of the compound present, the term "coating" is used with respect to the particular layer (or layers) in which the compound resides.

As used herein, the phrase "nonpolymeric β-dicarbonyl compound" refers to β-dicarbonyl compounds in which the β-dicarbonyl group is not located on the polymer to be crosslinked, but rather is:

(1) "free" (i.e. present on a reactive solvent and/or reactive diluent), and/or (2) present on the crosslinking entity (regardless of whether the crosslinking entity is polymeric).

Whether the product comprises A and/or B (above) depends upon whether all of the formaldehyde becomes part of the crosslinked polymer network. That is, in order to make the product of the present invention, an excess of a "free" β-dicarbonyl compound must be used in the process in order to ensure that the resulting product comprises A and/or B (above). In other words, enough of the β-dicarbonyl functionality must be used in the process to react with the free formaldehyde and/or the liberated formaldehyde (i.e. the formaldehyde which is liberated during the reaction of the aminoplasts or phenolics with the crosslinkable polymer). As a result, not only is the emission of formaldehyde lowered during the curing step, furthermore, the resulting product comprises A and/or B (supra).

Six paint formulations, described in Examples 1 through 6 below, were made up and tested for formaldehyde release. As is evident from the results of the determinations of formaldehyde release from this series of six paint formulations, the presence of a free beta-dicarbonyl compound in the paint formulation had a significant impact on the amount of formaldehyde released.

EXAMPLE 1

The first example was a control in which neither the resin nor the crosslinking agent were reacted with a betadicarbonyl compound, and furthermore in which no free beta-dicarbonyl compound was present. That is, in the control example no beta-dicarbonyl compound was present to react with the formaldehyde. The result, of course, was the release of a significant amount of formaldehyde, in comparison with other Examples (below) in which a beta-dicarbonyl compound was present on the backbone polymer itself, on the crosslinking entity, or as free beta-dicarbonyl compound. The control was made up by first making up a batch of Resin #1, as is described immediately below. All parts given are parts by weight.

| | |
|---|---|
| Xylene | 2250.3 |
| Styrene | 1355.9 |
| n-Butyl Acrylate | 2038.3 |
| Hydroxy Propyl Methacrylate | 2252.6 |
| Methacrylic Acid | 128.3 |

| T-Butyl Peroctoate | 749.0 |
| Xylene | 201.5 |

The above ingredients were combined to make Resin #1 by first charging 2250.3 parts of xylene to a reactor. Nitrogen was purged through the reactor at a level of 0.2 liters per minute. A stirrer was present in the reactor and was set to stir the reactor contents at a moderate level throughout the reaction process. The reactor was heated to a temperature necessary to produce reflux (i.e. 136° C.). After the xylene was charged to the reactor, a mixture of the styrene (1355.9 parts), n-butyl acrylate (2038.3 parts), hydroxy propyl methacrylate (2252.6 parts), methacrylic acid (128.3 parts), and t-butyl peroctoate (749.0 parts) was added to the reactor over a four hour period while a moderate reflux was maintained. After the mixture had been added, an additional quantity of xylene (201.5 parts by weight) was charged to the reactor. Then reflux was held for an additional hour, following which the reactor contents were cooled to 80° C., and thereafter poured off into a storage container. The resulting product is hereinafter referred to as Resin #1.

Resin #1 was analyzed and found to contain 68.9% solids, and the polymer had a number average molecular weight of 2771, a weight average molecular weight of 5156, and a viscosity of 4000 centipoise.

Resin #1 was then used to make a paint formulation (paint formulation #1). Formulation #1 was made by a two stage mixing process, in order to ensure optimum dispersion. In the first stage, 20.9 parts of Resimene 747 (a methylated monomeric melamine obtained from Monsanto Company in Springfield, Mass.), 17.6 parts xylene, 4.0 parts n-butanol, and 1.2 parts Nacure 2500 (an amine blocked paratoluene sulfonic acid catalyst from King Industries, Norwalk Conn.) were thoroughly mixed together. Then, in the second stage, 56.3 parts of Resin #1 were added to the mixture, and mixed thoroughly therewith. The result was the production of paint formulation #1.

Paint formulation #1 was then sent to Monsanto Chemical Company (in Springfield, Mass.) for testing to determine formaldehyde emissions from aminoplast-crosslinking thin film coatings. The testing was carried out as described in a Monsanto publication entitled "Procedure for the Analysis of Formaldehyde Emissions from CH$_2$O/Crosslinking Liquid Thin Film Coatings". This testing method was developed and written by Bob Clark, Matt Dragon, and James Downie, all of Monsanto Chemical Company in Springfield, Mass. This publication is hereby incorporated by reference.

The results from this testing are shown in Table I. As can be seen in Table I, formaldehyde release was 1.31 parts by weight, and the % loss of formaldehyde based on melamine in the formula was 3.74. Paint Formulation #1 is the control by which Paint Formulations 2 through 6 are measured, for comparative purposes of examining the degree to which the emission of formaldehyde is reduced.

EXAMPLE 2

The second example involved the use of Resin #1 and a "free" (unattached to any polymer or crosslinking agent) betadicarbonyl compound. A comparison of the formaldehyde release from this Paint Formulation #2 with Paint Formulation #1 (i.e. the control) revealed a substantial decline in the formaldehyde emission level, as can be seen from the results provided in Table I, below.

In making up Paint Formulation #2, Resin #1 was again used as to supply the polymer which was to be crosslinked. Of course, Resin #1 was again made up as described in Example 1, above. As in Example 1, Resin #1 was analyzed and found to contain 68.9% solids. The polymer had a number average molecular weight of 2771, a weight average molecular weight of about 5156, a viscosity of 4000 centipoise.

Resin #2 was then used to again make a paint formulation (paint formulation #1). As with Paint Formulation #1, Paint Formulation #2 was made by a two stage mixing process, in order to ensure optimum dispersion. In the first stage, 20.9 parts of Resimene 747, 4.0 parts n-butanol, 17.6 parts of free t-butyl acetoacetate, and 1.2 parts Nacure 2500 were thoroughly mixed together. Then, in the second stage, 56.3 parts of Resin #1 were added to the mixture, and mixed thoroughly therewith. The result was the production of paint formulation #2.

Paint formulation #2 was then sent to Monsanto Chemical Company (in Springfield, Mass.) to evaluate the level of formaldehyde emissions during the production of aminoplast crosslinked thin film coatings. The testing was carried out as in Example 1, again by the procedure described in the Monsanto publication described above. The results from this testing are shown in Table I. As can be seen in Table I, formaldehyde release was 0.72 parts by weight, and the % loss of formaldehyde based on melamine in the formula was 2.04. In comparison with Paint Formulation #1 (the control), Paint Formulation #2 emitted 45% less formaldehyde. The t-butyl acetoacetate can be understood as serving as a reactive solvent, i.e. both as a solvent for the resin as well as a reactive species for reacting with (and thereby trapping) the formaldehyde liberated both in the crosslinking reaction as well as that present as free formaldehyde in the melamine compound.

EXAMPLE 3

The third example involved the use of another resin, herein termed "Resin #2". Resin #2 comprised a polymer having a beta dicarbonyl functionality attached directly thereon. Resin #2 was made up by first charging 2000 parts of Resin #1 and 437 parts t-butyl aceto-acetate to the reactor. Nitrogen was set to 0.2 liters per minute, and the reaction vessel was subjected to moderate stirring. Then the heat was raised to 120° C. and held at that temperature for 2 hours, while stirring was maintained at a high level. 204.9 parts of t-butanol were released from the reactor during this period. All of the tbutanol released was collected in a Dean-Stark trap. Once 203 grams of t-butanol had been released, the reactor was shut down and allowed to cool and post react. Once the reaction product had cooled, it was poured off into a storage container. The resulting product is hereinafter referred to as Resin #2.

Resin #2 was analyzed and found to contain 70.89% solids and 80% of the hydroxy groups on the polymer were found to have been acetoacetylated. Furthermore, the polymer had a number average molecular weight of 3134, a weight average molecular weight of about 5579, and a viscosity of 700 centipoise.

Resin #2 was then used to make a paint formulation (Paint Formulation #3). Paint Formulation #3 was made by a two stage process, in order to ensure optimum dispersion. In the first stage, 20.9 parts of Resimene 747, 19.2 parts xylene, 4.0 parts n-butanol, and 1.2 parts Nacure 2500 were thoroughly mixed together. Then, in the second stage, 54.7 parts of

11

Resin #1 were added to the mixture, and mixed thoroughly therewith. The result was the production of paint formulation #3.

Paint formulation #3 was then sent to Monsanto Chemical Company (in Springfield, Mass.) for testing of formaldehyde emissions from aminoplast-crosslinking used to produce thin film coatings. The testing was carried out as in Example 1, again by the procedure described in the Monsanto publication described above. The results from this testing are also shown in Table I. As can be seen in Table I, formaldehyde release was 0.834 parts by weight, and the % loss of formaldehyde based on melamine in the formula was 2.38. In comparison with Paint Formulation #1 (the control), Paint Formulation #2 emitted 37% less formaldehyde. In Paint Formulation #3, the t-butyl acetoacetate can be understood as serving as a reactive species for reacting with (and thereby trapping) the formaldehyde liberated both in the crosslinking reaction as well as the free formaldehyde in the melamine compound.

EXAMPLE 4

In making up Paint Formulation #4, Resin #2 was again used as to supply the polymer which was to be crosslinked. Of course, Resin #2 was again made up as described in Example 3, above. As in Example 3, Resin #2 was analyzed and found to contain 70.89% solids, and 80% of the hydroxy groups on the polymer were found to have been acetoacetylated. Furthermore, the polymer had a number average molecular weight of 3134, a weight average molecular weight of about 5579, and a viscosity of 700 centipoise. Resin #2 was again made precisely as described in Example 3, above.

Resin #2 was again used to make a paint formulation (Paint Formulation #4). Paint Formulation #4 was also made by a two stage mixing process, in order to ensure optimum dispersion. In the first stage, 20.9 parts of Resimene 747, 4.0 parts n-butanol, 19.2 parts of t-butyl aceto acetate, and 1.2 parts Nacure 2500 were thoroughly mixed together. Then, in the second stage, 54.7 parts of Resin #2 were added to the mixture, and mixed thoroughly therewith. The result was the production of paint formulation #4.

Paint formulation #4 was then sent to Monsanto Chemical Company (in Springfield, Mass.) for testing of formaldehyde emissions from aminoplast-crosslinking in the production of thin film coatings. The testing was carried out as in Example 1, again by the procedure described in the Monsanto publication described in Example 1. The results from this testing are also shown in Table I. As can be seen in Table I, in Paint Formulation #4 80% of the hydroxy groups on the polymer were acetoacetylated. Paint Formulation #4 released 0.474 grams of formaldehyde. Based on the amount of melamine in the formulation, 1.35 weight percent of the of formaldehyde was released. In comparison with Paint Formulation #1 (the control), Paint Formulation #4 emitted 65% less formaldehyde.

In Paint Formulation #4, the t-butyl acetoacetate can be understood as serving as a reactive species for reaction with (and thereby trapping) formaldehyde liberated as by free formaldehyde and/or formaldehyde formed via degradation of the melamine compound. Furthermore, since Paint Formulation #4 involved the addition of t-butyl acetoacetate to Resin #2, there was a significant quantity of "free" beta-acetoacetoxy functionality to serve as a reactive solvent in order to lower the viscosity, and as a reactant for consuming formaldehyde released as free formaldehyde, and by the degradation of the melamine compound.

EXAMPLE 5

In making up Paint Formulation #5, Resin #2 was again used as to supply the polymer which was to be crosslinked. Of course, Resin #2 was again made up as described in Example 3, above. As in Example 3, Resin #2 was analyzed and found to contain 70.89% solids, and 80% of the hydroxy groups on the polymer were found to have been acetoacetylated. Furthermore, the polymer had a number average molecular weight of 3134, a weight average molecular weight of about 5579, and a viscosity of 700 centipoise. Resin #2 was again made precisely as described in Example 3, above.

Resin #2 was again used to make a paint formulation (Paint Formulation #5). Paint Formulation #5 was also made by a two stage mixing process, in order to ensure optimum dispersion. In the first stage, 15.0 parts of Resimene 747, 16.0 parts xylene, 4.6 parts n-butanol, and 1.4 parts Nacure 2500 were thoroughly mixed together. Then, in the second stage, 63.0 parts of Resin #2 were added to the mixture, and mixed thoroughly therewith. The result was the production of paint formulation #5.

Paint formulation #5 was then sent to Monsanto Chemical Company (in Springfield, Mass.) for testing to determine formaldehyde emissions from aminoplast-crosslinking thin film coatings. The testing was carried out as in Example 1, again by the procedure described in the Monsanto publication described in Example 1. The results from this testing are also shown in Table I. As can be seen in Table I, in Paint Formulation #5 80% of the hydroxy groups on the polymer were acetoacetylated. Paint Formulation #5 released 0.26 grams of formaldehyde. Based on the amount of melamine in the formulation, 1.04 weight percent of the of formaldehyde was released. In comparison with Paint Formulation #1 (the control), Paint Formulation #5 emitted 80% less formaldehyde.

In Paint Formulation #5, the t-butyl acetoacetate can be understood as serving as a reactive species for reacting with (and thereby consuming) formaldehyde liberated both as free formaldehyde and as a result of the degradation of the melamine compound. The percentage reduction of formaldehyde release for Example 5 was greater than the percentage reduction of formaldehyde release for Example 4 even though no "free" beta-dicarbonyl functionality was present in Paint Formulation #5. This is undoubtedly because relatively less melamine and relatively more beta-dicarbonyl functionality was present in Paint Formulation #5 as opposed to Paint Formulation #4. Example 6 investigates the effect of the addition of free t-butyl aceto acetate to Paint Formulation #5.

EXAMPLE 6

In making up Paint Formulation #6, Resin #2 was again used to supply the polymer which was to be crosslinked. Of course, Resin #2 was again made up as described in Example 3, above. As in Example 3, Resin #2 was analyzed and found to contain 70.89% solids, and 80% of the hydroxy groups on the polymer were found to have been acetoacetylated. Furthermore, the polymer had a number average molecular weight of 3134, a weight average molecular weight of about 5579, and a viscosity of 700 centipoise. Resin #2 was again made precisely as described in Example 3, above.

Resin #2 was again used to make a paint formulation (Paint Formulation #6). Paint Formulation #6 was also made by a two stage mixing process, in order to ensure optimum dispersion. In the first stage 15.0 parts of Resimene 747, 4.6 parts n-butanol, 16.0 parts of t-butyl aceto acetate, and 1.4 parts Nacure 2500 were,thoroughly mixed together. Then, in the second stage, 63.0 parts of Resin #2 were added to the mixture, and mixed thoroughly therewith. The result was the production of paint formulation #6.

Paint formulation #6 was then sent to Monsanto Chemical Company (in Springfield, Mass.) for testing to determine formaldehyde emissions from aminoplast-crosslinking thin film coatings. The testing was carried out as in Example 1, again by the procedure described in the Monsanto publication described in Example 1. The results from this testing are also shown in Table I. As can be seen in Table I, in Paint Formulation #6 80% of the hydroxy groups on the polymer were acetoacetylated. Paint Formulation #6 released 0.23 grams of formaldehyde. Based on the amount of melamine in the formulation, 0.92 weight percent of the of formaldehyde was released. In comparison with Paint Formulation #1 (the control), Paint Formulation #6 emitted 83% less formaldehyde.

In Paint Formulation #6, the t-butyl acetoacetate can be understood as serving as a reactive species for reacting with (and thereby consuming) formaldehyde liberated both in the crosslinking reaction as well as the formaldehyde that is free in the melamine compound. Furthermore, the free t-butyl acetoacetate further functions as a reactive solvent, whereby the t-butyl acetoacetate serves as a solvent for the polymer until it reacts with the formaldehyde. Since Paint Formulation #6 had both the "free" t-butyl acetoacetate as well as the acetoacetate functionality located on the polymer, it can be understood why the percentage reduction in formaldehyde emissions was more for Paint Formulation #6 than for Paint Formulation #5, since all other factors were identical.

Example 6 illustrates that even for a formulation which is very high in acetoacetylated resin and very low in melamine, the addition of any significant quantity "free" beta-dicarbonyl functionality can have a measurable, desirable impact on the release of formaldehyde.

TABLE I

| Example No./ Formulation Number | % OH aceto-acetylated | gms.$CH_2O$ released | % loss of $CH_2O$ (based on melamine) | % reduction of emissions of CH2O |
|---|---|---|---|---|
| 1 (control) | 0 | 1.31 | 3.74 | 0 |
| 2 | 0 | .72 | 2.06 | 45 |
| 3 (compar.) | 80 | .834 | 2.38 | 37 |
| 4 | 80 | .474 | 1.35 | 65 |
| 5 (compar.) | 80 | .26 | 1.04 | 80 |
| 6 | 80 | .23 | .92 | 83 |

We claim:

1. A method of producing a crosslinked polymer, comprising the steps of:

A. reacting a crosslinker selected from the group consisting of aminoplasts, isocyanates, and phenolics, with a β-dicarbonyl functional compound, B. mixing a crosslinkable polymer selected from the group consisting of an acrylic polymer, a polyester, a phenolic polymer, an epoxy polymer, and a polyurethane, with the reaction product of the crosslinker and β-dicarbonyl functional compound, from step A, and C. curing the mixture from step B so that the crosslinkable polymer reacts with the reaction product of the crosslinker and the β-dicarbonyl functional compound, whereby the polymer is crosslinked.

2. A method as described in claim 1, wherein the method further comprises consuming at least 50 percent of all formaldehyde which is both present and liberated during the curing of the mixture.

3. A method as set forth in claim 1, wherein the crosslinker is an aminoplast crosslinker, whereby both free formaldehyde, as well as liberated formaldehyde produced during curing, are consumed in the crosslinking reaction.

* * * * *